Figure 1:
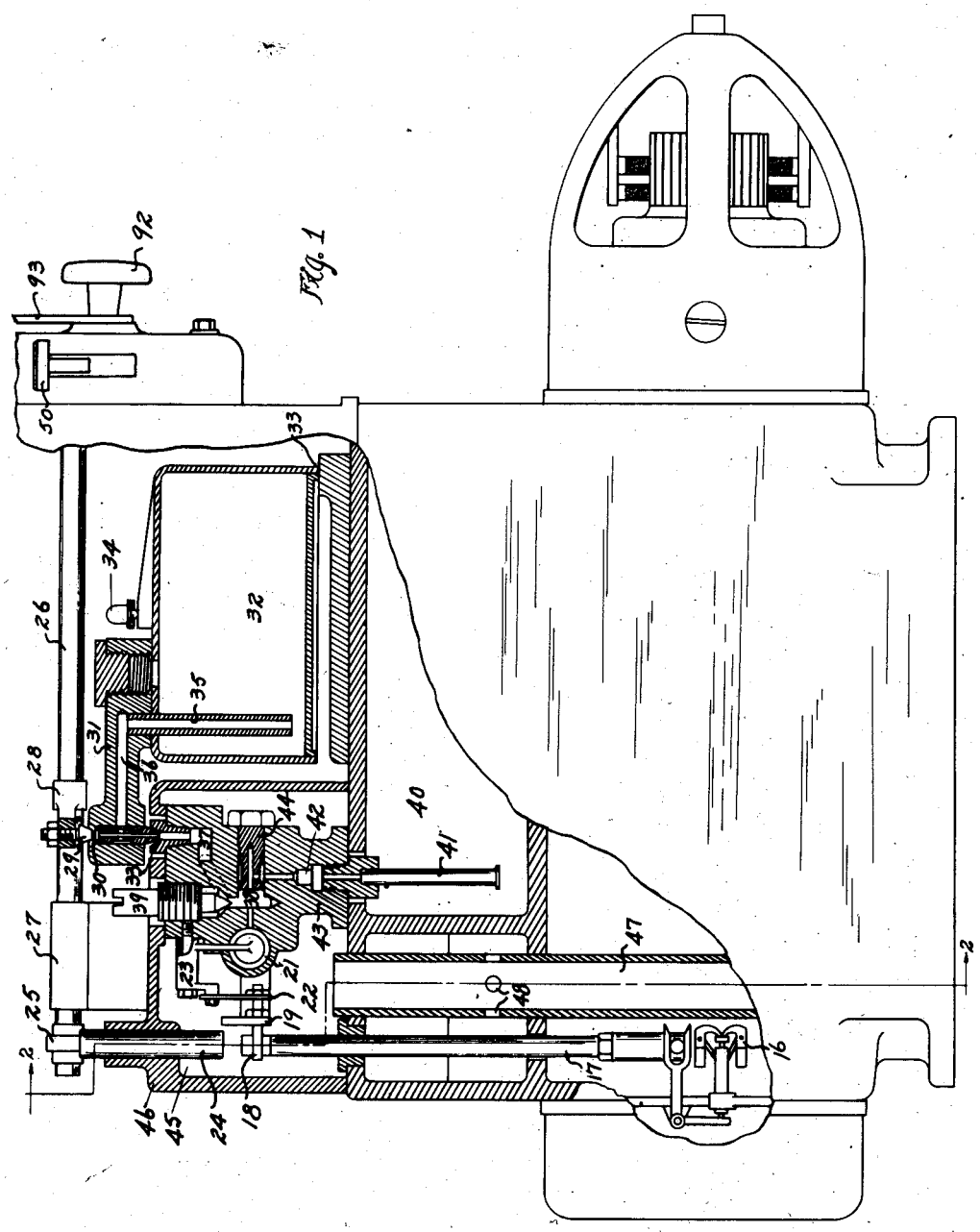

Aug. 11, 1931.  A. ROSNER  1,817,944
POWER PLANT
Filed Dec. 16, 1927   5 Sheets-Sheet 1

INVENTOR
Adolph Rosner
BY Roy M Eilers
ATTORNEY

INVENTOR
Adolph Rosner

Patented Aug. 11, 1931

1,817,944

UNITED STATES PATENT OFFICE

ADOLPH ROSNER, OF BELOIT, WISCONSIN, ASSIGNOR TO FAIRBANKS, MORSE & CO., OF CHICAGO, ILLINOIS, A CORPORATION OF ILLINOIS

POWER PLANT

Application filed December 16, 1927. Serial No. 240,524.

This invention relates to power plants comprising dynamo machines driven by internal combustion engines, and especially to improvements in the fuel supply, priming means, carburetion systems, and means for the interdependent mechanical control of electrical circuits used in connection with power plants of the class described.

The object of this invention is to provide means whereby a single control effects all necessary starting adjustments, following the closing of a starting switch.

A further object is to provide a semi-automatic priming means, manually put into effect, and automatically released, and which is equally applicable whether the same or different fuels are used for starting, and for the normal operation of the engine.

A further object is to provide automatic interdependent mechanical means controlling a throttle valve, and an air inlet opening, this means being interdependent with the priming means and operated by the same single control.

A further object is to provide a mechanically operated reverse current cut-out in assemblies where the engine operates a generator for charging secondary batteries, the cut-out preventing reversal of current except for starting purposes, and being controlled by the same interdependent mechanical means that controls carburetion, the throttle and the priming device.

A further object is to provide means to silence effectively the usual intake air suction noise occurring in an internal combustion engine, and means whereby with the same device, oil and fuel vapors may be reclaimed from the crank case of the engine.

A further object is to provide automatic means for compensating for differences in fuel mixture normally resulting from differences in level of fuel, and without the use of a float chamber or its equivalent.

In existing types of engines it has been necessary upon starting, to deliver fuel in greater amounts than when running. It has been necessary, in case a different fuel is used for starting, to control by valves, cocks or the like, the kind of fuel delivered to the engine. It is the usual practice on starting to set the throttle at a particular position and to restrict the air passage, manually or by a suitable valve or shutter. Where the engine is used with dynamo machines, in connection with secondary batteries, it is customary to reverse the direction of current and to utilize the generator as a motor to start the engine. In this device, a single manual control accomplishes all of the above enumerated operations by a single movement of a lever provided for the purpose, and which is operated following the closing of a starting switch. As soon as the engine operates under its own power, a simple governor-controlled mechanism automatically puts all of the controls into running position. The advantages thus derived from this unit control of an entire engine and dynamo assembly, will be apparent, especially in the cases of small units in the hands of inexperienced operators. The device has a minimum of moving parts and wearing points and results in a practically trouble-proof assembly.

While by way of illustration I show the control mechanism as adapted to an internal combustion engine connected directly to a generator, and used with a secondary battery installation, the same device with or without modifications may be used on other generating systems, or any or all of the priming, throttle and air control features may be adapted to any internal combustion engine having a suitable governing arrangement.

Although my invention consists largely in the construction and arrangement of parts hereinafter described and particularly pointed out in the claims, yet I do not limit the invention to the precise form or construction of parts shown or the several parts thereof, inasmuch as various alterations may be made without changing the scope of my invention.

Figure 2:
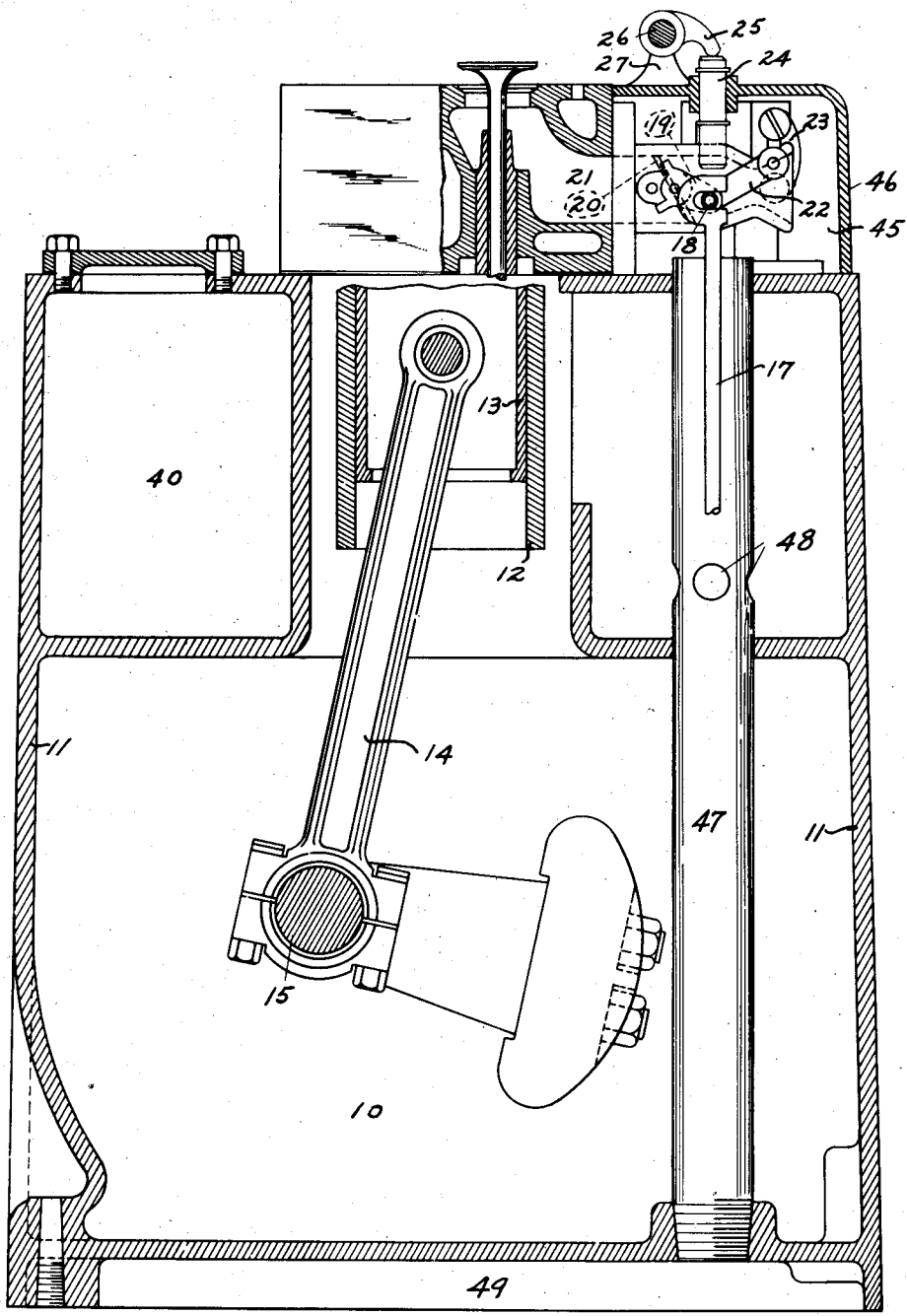
Figure 3:
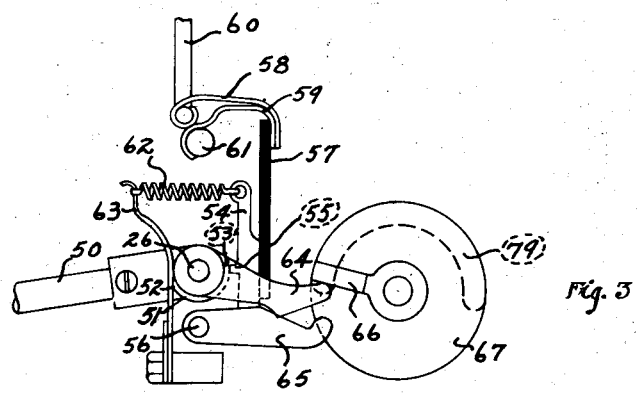
Figure 4:
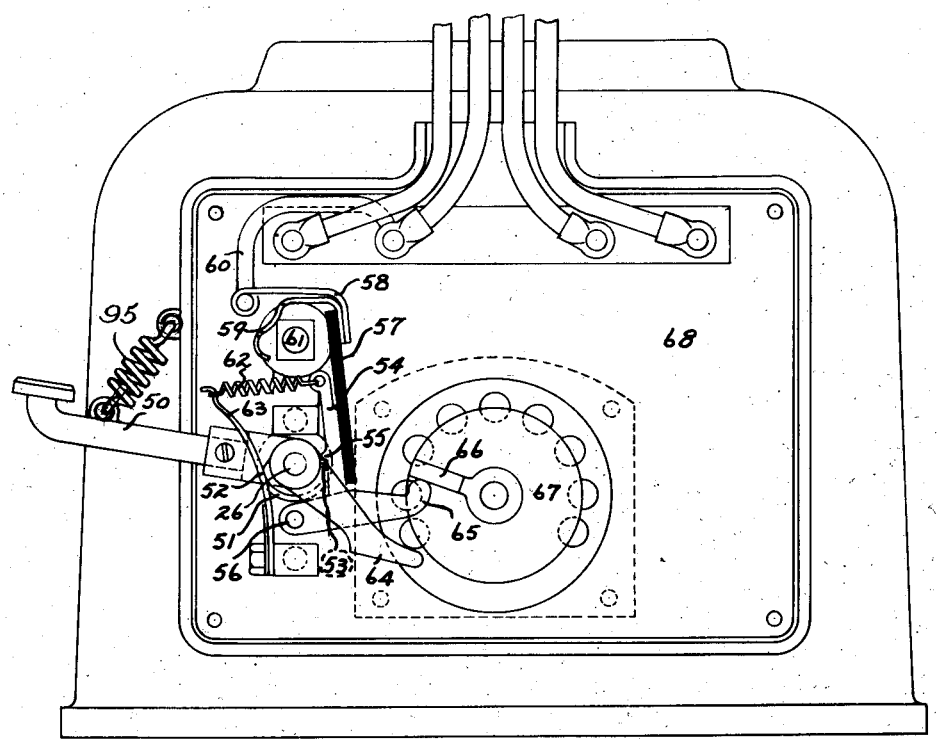
Figure 5:
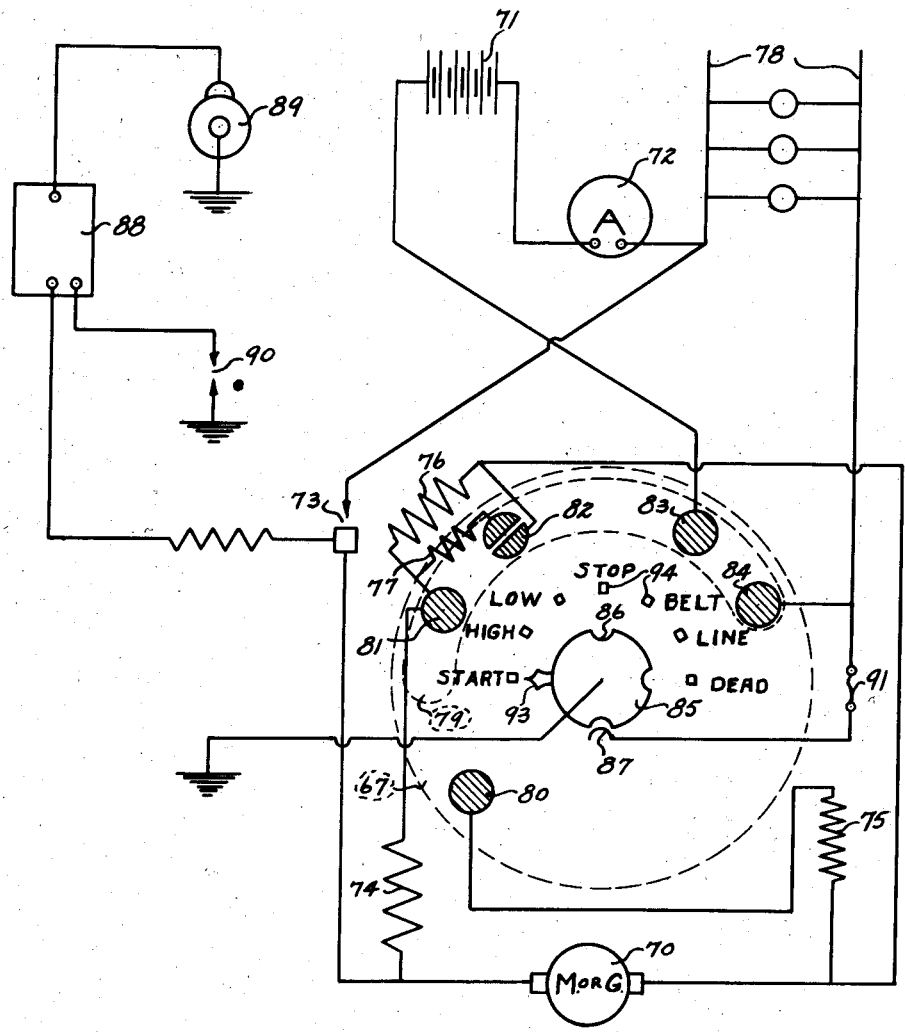
Figure 6:
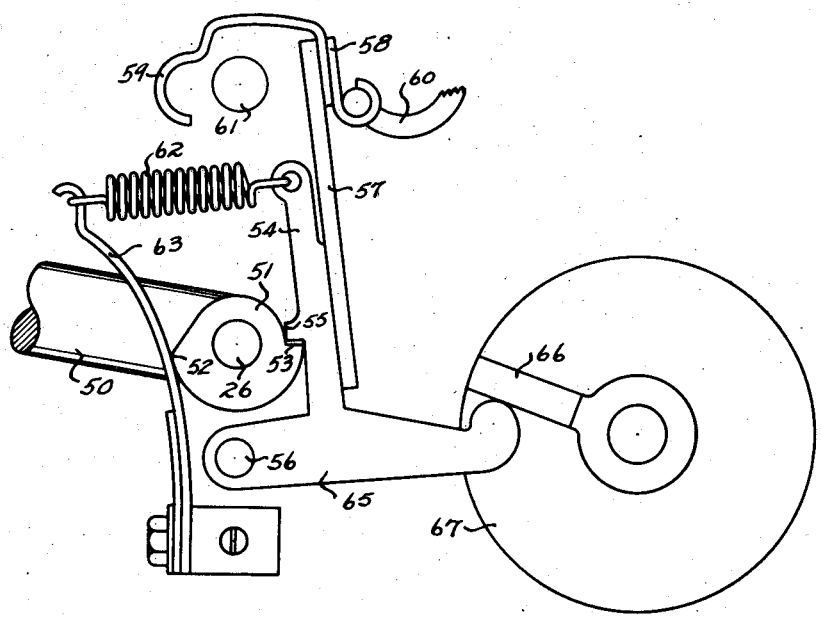

Referring to the drawings, Fig. 1 represents an elevational view partially in section, of an internal combustion engine and generator unit to which a preferred embodiment of this invention is applied. Fig. 2 represents a sectional view taken along line 2—2 in Fig. 1. Fig. 3 indicates diagrammatically the mechanical cut-out in its closed position. Fig. 4 is a fragmentary end view showing the mechanical cut-out in open position, and the switching means. Fig. 5 is a diagram showing the various circuit relations of the switch, generator and ignition system, in the starting position. Fig. 6 indicates diagrammatically, the mechanical cut-out, with certain of its parts shown in the open, or before-starting position; certain parts being omitted for clearness, and Fig. 7 indicates diagrammatically the mechanical cut-out, showing the position of certain of its parts (in full lines) during the priming or starting period of the engine, and also showing (in dotted lines) the position of these parts during the normal running of the engine, certain parts being omitted for clearness of illustration.

Referring by reference characters to the drawings, 10 represents a crank case chamber preferably enclosed by a crank case 11. 12 indicates a power cylinder, 13 a piston therein, which is operably connected to one end of a connecting rod 14. The other end of the rod 14 is pivotally connected with crank shaft 15. A governor, shown diagrammatically at 16, which may be of any suitable form, and is by preference so connected with a rod 17 that increase in engine speed will move the rod 17 downwardly. At 18 is shown a pin preferably inserted in, and actuated by, a hook or yoke arrangement on top of rod 17. Pin 18 serves to actuate one end of a link 19, the other end of which is connected with the engine throttle 20. The throttle member may consist of a usual type of butterfly valve, although other forms of throttle may be used. The throttle 20 tends to open or close a fuel mixture passage 21, and thus regulates the amount of fuel mixture admitted to the cylinder. Pin 18 also actuates one end of a link 22, the other end of which is connected to a ball-ended lever 23 pivoted at one end, and so mounted that upon depressing rod 17, as will later be shown, the lever 23 is brought to a position where the ball-end of the lever greatly restricts the narrow neck of a portion of Venturi passage 21, giving a choking effect for starting. This is effected by the partial or total obstruction of the air passage into the Venturi portion of passage 21.

When rod 17 is above a certain height, a plunger 24 is impinged by the top portion of the yoke member on top of the rod 17. Above the plunger 24 is located a lever 25, one end of which is in a position to be engaged by the plunger. The lever 25 is carried by a shaft 26. The shaft is in turn carried by bearings or brackets 27. It will be seen that the shaft 26 is given an incomplete rotating motion by rod 17, as the latter is moved up or down responsively to the position of the parts of the governor assembly. For convenience in description, the shaft 26 will, hereinafter, be referred to as a governor actuated shaft. It will, of course, be understood that the shaft 26 is only at certain times under the influence of the governor 16. When the speed of the engine has been decreased materially, or when the engine is dead, the governor and its related parts causes the rod 17 to move upwardly, into contact with the lever 25. This movement places the shaft 26 under the control of the governor, for a purpose hereinafter appearing. A lever 28, carrying a tapered member or cone 29, is also affixed to shaft 26 substantially as shown. When shaft 26 is manually rotated as hereinafter explained, cone 29 preferably obstructs an opening 30 in member 31. The opening 30 serves as an air inlet, except when the cone 29 is in the down or starting position to permit suction of fuel from auxiliary fuel tank 32 through passages 35, 36, 37 and 38. Auxiliary fuel tank 32 is preferably supported at points 33, and may be positioned by a spring clamp 34, shown in section, (see Fig. 1). 39 represents a needle valve or other suitable air adjustment, preferably mounted in opening 38.

At 40 is shown the main fuel reservoir into which extends a fuel supply pipe 41, connected with passage 42 in the fuel mixer body 43. Passage 42 is in communication with passage 38 which leads to Venturi passage 21. At 44 is shown a removable threaded plug, provided with drilled fuel channels connecting passages 42 and 38. By using different plugs 44, with different sized fuel channels therein, provision is made for handling different grades of fuel.

45 represents one form of an air tight chamber containing the fuel mixer body and enclosed by cover 46. Intake air is supplied to chamber 45 through a conduit 47, (breather openings 48 therein), and passage 49, as will hereinafter appear. Openings 48 may be provided with screens, (not shown), to prevent splashing of crank case oil into the conduit 47.

Figure 7:
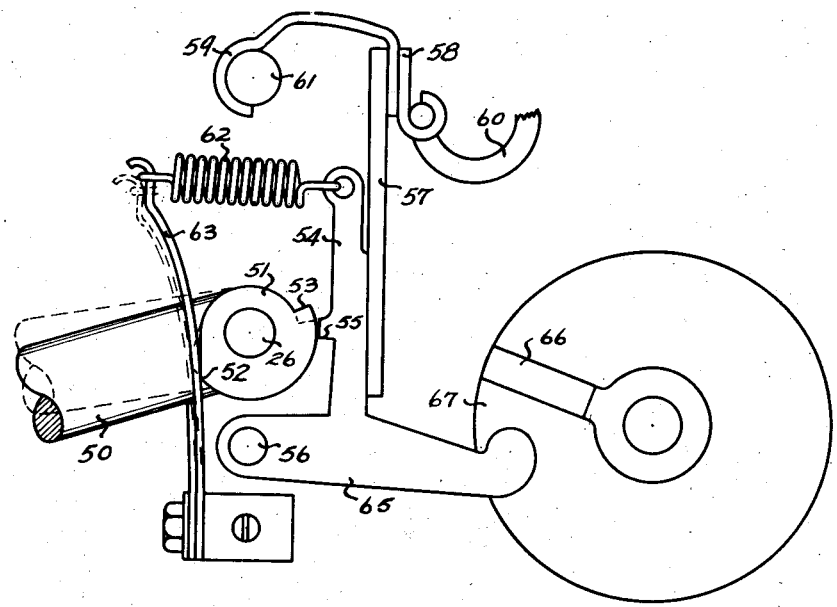

A preferred form of reverse current cut-out is shown in Figs. 3 and 4. 26 represents the end of a governor actuated shaft, such as the shaft shown in Fig. 1. Carried by shaft 26 is a lever 50, by which shaft 26 may be partially rotated at the time of starting the engine. 51 represents a cam, preferably adjustably affixed to shaft 26, and which has a high point 52, as best shown in Figs. 6 and 7. Diametrically opposite point 52 is a cam step 53 adapted to engage a projection 55 on a cut-out lever 54. This cut-out lever swings about pin 56 as a fulcrum. The projection 55 coacts with the cam step 53 to serve as a stop for lever 54 in its cut-out position, and together with the cam 51, acts to lock the lever in place, in its cut-in position. To the cut-out lever 54 is affixed an insulated strip 57 on which are mounted parts 58 and 59. 58 is a metal member affixed to 60, one of the leads to the cut-out. At 59 is shown a spring contact piece, making contact with 61 when the cut-out is closed. A spring 62 is interposed between lever 54 and a flexible member 63, which impinges against the cam 51. Affixed to shaft 26 is a lever 64, (see Figs. 3 and 4), and mounted on pin 56 is a lever 65. Lever 65 serves to engage a projection 66 on a rotatable, multiple contact switch 67. The latter is used to complete the various electrical circuits necessary to provide for the different charging rates, generator and line connections, indicated diagrammatically in Fig. 5, from which it will also be seen that the switch 67 controls the ignition circuit of the engine. Lever 64 serves automatically to position the switch 67 when the cut-out is closed, as during the starting period, as will be hereinafter described. Lever 65 likewise engages projection 66 and automatically positions switch 67, when the cut-out opens.

At 68 is shown a preferred arrangement of switch panel, on which is mounted the mechanical reverse current cut-out, the multiple switch, an ammeter, and other instruments, (not shown). Switch panel 68 may be of any suitable insulating material.

Referring especially to Fig. 5, which is a diagrammatic illustration of the arrangement of circuits, 70 indicates a dynamo, preferably of the general type and arrangement shown in Fig. 1. 71 is a secondary battery of any suitable sort, for example a lead and acid type storage battery. An ammeter is provided as shown at 72, to enable observation of the rates of charge and discharge. The ammeter may be located on the switch board with the other instruments and controls. 73 indicates diagrammatically the cut-out, which consists essentially of a spring contact member 59 and a stationary terminal 61, with related parts, as will appear from Figs. 3 and 4.

The dynamo 70 is by preference provided with a shunt field 74 and a series field 75. The fields are in such circuit relation with the machine and terminals of the rotating switch 67, as to enable their use separately, or to enable the use of the dynamo as a compound machine. Shunt field resistances 76 and 77 are interposed to provide a control of the charging rate, when the plant is used with batteries.

The legs of the line circuit are shown at 78.

The switch rotor shown and described at 67 above, is provided on one side with a metal contacting segment 79, which may be spring pressed to impinge selectively upon stationary contact terminals 80, 81, 82, 83 and 84. The switch rotor 67 is arranged to rotate with an ignition switch rotor 85, preferably concentric with member 67. This ignition switch member may be affixed to, or carried by the switch rotor 67, or both of the rotors may be disposed on a common shaft, so as to be rotatable together by a common control. The ignition switch 85 is provided with a plurality of notches or depressions 86; in the present example three such notches are provided. It will be understood, however, that a greater or less number of the notches may be used, depending upon the number of different positions provided for the multiple contact switch rotor 67. The notches 86 are adapted to receive a flexible arm 87, which forms contact with, and is adapted to ride upon the surface of rotor 85, except when the flexible arm passes over the notches 86, at which time the ignition circuit is interrupted.

A simple and preferred form of ignition circuit is shown in Fig. 5, and comprises a coil 88, timer 89, and a spark plug 90. In the case of multi-cylinder units, a distributor, and several of the spark plugs will be located in the high tension circuit from the coil. A protective fuse may be located in the circuit, as shown at 91, in order to prevent excessive current from entering the ignition system.

In the example shown, it is intended that the switch rotor 67 be capable of complete separate manual control, in addition to the automatic control afforded by the governor operated shaft 26, with its connected mechanism. The manual control of the multiple contact switch is effected through a handle 92, (see Fig. 1). In connection with the handle, or affixed thereto, is a pointer 93. The pointer 93 co-operates with switch position indicators 94, which are preferably fixed points designated on the front of the switchboard 68, or on some other exposed surface. The pointer 93, co-operating with the position indicators 94 provides a visible index of the position of switch rotor 67. A preferred arrangement of the pointer and position indicating means is shown diagrammatically in Fig. 5. This showing corresponds to the arrangement actually provided in the power plant shown in Fig. 1.

A number of the advantages of the features of construction described in detail above, will be apparent from the description of parts. In existing types of internal combustion engines and especially in those designed for domestic use, the suction of air incident to the mixture of fuel has been an objectionable source of noise. In my device this noise is effectively muffled by admitting air underneath the crank case through passage 49, which is of substantial cross-sectional area, into an intake air conduit 47, thence to air tight chamber 45, in which is located the fuel mixer with its accessories, and from which the intake air is obtained by the mixer.

Conduit 47 is preferably provided with openings 48 into the crank-case. In operation these openings act as crank-case breather openings and permit drawing back into the cylinder all unburned gas and oil vapor escaping past the piston into the crank-case.

A further objection to prevailing forms of engines is found in the fact that a substantial difference in fuel mixture results from a variation in fuel level, affecting the total head on the fuel suction. In my arrangement the main fuel tank 40 is so located with respect to the cylinder of the engine that as the fuel level in tank 40 recedes, the heating effect of the cylinder will compensate for the lower level of the fuel. In practice it is found that the increase in volatility and decrease in viscosity due to this heating effect, practically balance the tendency toward a leaner mixture ordinarily caused by a receding fuel level. This construction eliminates the necessity of using a float chamber, with its expense, uncertainty and liability to stoppage and leakage.

The operation of this device has been rendered entirely automatic except for a simple starting operation, consisting first, in closing switch 67, by manual rotation, and secondly, in depressing the lever 50.

Multiple switch 67 is rotated counter-clockwise as far as possible, to the "start" position, as shown in Fig. 5, thus closing the generator circuit through the cut-out, and causing the generator to function as a motor to start cranking the engine. The counter-clockwise rotation of multiple switch 67, as shown in Fig. 6, causes the projection 66 on the multiple switch 67 to engage the lever 65, which rotates clockwise about its fulcrum 56, and to move the cut-out lever 54 therewith. This movement continues until the member 59 on the cut-out lever 54 engages the fixed contact 61, thus establishing a circuit between the storage battery and the dynamo (see Fig. 5), which causes the generator to function as a starting motor to crank the engine. It will be readily seen that this clockwise movement of the cut-out lever 54 causes the projection 55 to move away from the cam step 53. While the cut-out is being held in this closed position by the lug 66 on the multiple switch 67, the priming lever 50, as best seen in Fig. 7, is depressed, causing the cam 51 to move counter-clockwise. By the previous movement of the multiple switch 67, the projection 55 on the lever 54 has been moved away from the cam step 53, thereby permitting the cam nose 53 to clear the projection 55, and to permit the cam 51 to rotate its high point 52 to a position where the spring tension through the member 63, is decreased. By this provision the flexible member 63 and the cam 51 tend to lock, or press the projection 55 into closer contact with the outer face of the cam 51, as best seen in Fig. 7. The same movement of the lever 50, as best seen in Fig. 3 causes the lever 64 to impinge upon the lug 66 on switch 67, to rotate this switch clockwise to the high or running position, and also to close the ignition circuit through contact between arm 87 and the rotor 85, as best seen in Fig. 5. This positive movement of the rotor 85 by the lever 64 is necessary in order that the projection 66 on the switch 67 will not interfere with the movement of the lever 65, if for any reason the cutout is opened.

The lever 50 is then held down by hand until the engine is rotated at a reasonable speed by the generator, serving as a starting motor. The downward movement of hand lever 50 partially rotates shaft 26, which, acting through lever 25 and member 24, thus depresses governor-actuated rod 17 somewhat below its normal operating position. By the same operation, throttle valve 20 is properly positioned for starting, through the action of pin 18 and link 19. Pin 18 at the same time, by means of link 22, serves to move the ball end of lever 23 into the restricted portion of Venturi passage 21. This considerably reduces the air intake at this point, increases the air velocity, and increases suction from passage 38. By the same manual depression of hand lever 50 and consequent rotation of shaft 26, lever 28 carrying cone 29 is forced downwardly so that cone 29 closes opening 30 during the starting period. Opening 30 is normally an air opening; its restriction by cone 29 causes starting fuel to be drawn directly from auxiliary fuel tank 32, through passages 35, 36, 37, and 38, directly into Venturi passage 21. While starting, however, the main fuel supply is not out of communication with the mixer, but the running fuel is still available through its regular channels, viz., from main fuel tank 40 through passages 41, 42, and 38. The priming fuel simply serves to enrichen the mixture for starting.

When the engine has attained a sufficient speed from the generator, operating as a motor, the hand lever 50 is released, and the position of governor-actuated rod 17 and hence of shaft 26, is thereafter determined by the engine speed and governor position. The governor actuated parts having been depressed below their normal running position, will automatically be restored to this position. A light coil spring 95 or the equivalent, may be connected to lever 50 to restore this lever to a normal running position, after it has been depressed for starting. In the example shown, the action of the governor is preferably to lower rod 17 with increase of engine speed, although the same result may be effected in other suitable ways. After the starting period, when the engine begins to operate under its own power, the governor-actuated rod is raised, under the action of the governor spring, and the rod then assumes a normal running position because of its previous extreme depression by hand lever 50 at the time of starting.

The effect of releasing lever 50 and the return of rod 17 and shaft 26 to normal running positions, is to permit full automatic governor control of throttle 20, through means before described. A further effect is the governor control of ball-ended lever 23, viz., its removal from the open end of Venturi passage 21, permitting a normal air passage therethrough. At the same time, by means before described, the partial rotation of shaft 26 causes cone 29 to be lifted clear of opening 30, permitting the suction of air through this opening and thus eliminating any suction to auxiliary fuel tank 32. Fuel is thereafter taken entirely from the main fuel tank 40.

The mechanical reverse current cut-out, having been closed for starting the engine, remains closed for charging as long as engine speed is nearly normal, but will open if engine speed decreases to a point where current reversal may result. With material decrease of engine speed, the parts of the governor 16 will tend to move the rod 17 upwardly, as seen in Fig. 1. By this movement the rod 17 will impinge upon the lever 25, which is attached to the shaft 26, and cause this shaft to rotate clockwise, (Fig. 7). Further clockwise rotation of the shaft, by means of the rod 17, will move the cam nose 53 to a position where the projection 55 will drop or snap into the cam step 53, and thereby opening the cut-out switch, as seen in Fig. 6.

It will be seen that the tension on spring 62 and member 63, will be increased when the circuit is about to be broken, and that the effect of the spring and the high points of the cam, is to provide a quick action in interrupting the circuit, as well as a good connection between members 59 and 61, when the cut-out is closed. After the extreme counter-clockwise movement of shaft 26 and cam 51, during the starting period, these parts are partially rotated clockwise by the action of the spring 95 upon the lever 50. Their clockwise movement will not, however, be sufficient in this direction to permit engagement of cam step 53 with projection 55 and thus open the cut-out; the closed position of this switch being necessary to furnish a path for the charging current. It will be seen from the position of parts shown in dotted lines in Fig. 7, that the complete rotation of these parts to the open position, is prevented by the locking action of the flexible member 63 upon the lever 54. It will be readily seen that clockwise rotation of cam 51, causes the high point 52 to impinge upon, and to move the flexible member 63 to the left in Fig. 7, and thus to increase the tension of the spring 62, in order to press the projection 55 into frictional retaining engagement with the outer face of the cam 51, and thereby tending to keep the parts 59 and 61 in contact, to maintain the generator circuit closed.

The manual rotation of rotor 67, by handle 92 serves to establish the various electrical circuits. By the above described movement, when the switch rotor is turned so that switch pointer 93 is in its extreme counter-clockwise position, or the "start" position, the contacting segment 79 engages terminals 81, 82, 83, and 84, which interconnect portions of the circuit hereinafter described. At the same time, the cut-out 73 is closed automatically by impingement of projection 66 upon lever 64, as described, and shown in Fig. 3. At this time battery 71 is connected to the dynamo 70, which then functions as a shunt wound motor, cranking the engine. It will be seen from Fig. 5, that flexible arm 87 rides in one of the notches 86 of the ignition switch rotor 85, and the ignition circuit is open. If the ignition circuit were closed in this position, firing might occur before the priming and choking steps were completed, as described. With the priming device inoperative, the battery might discharge itself through the dynamo after firing had ceased.

When rotor 67 and pointer 93 are turned to the "high" position, contacting segment 79 engages terminals 81, 82, 83 and 84. Shunt field resistances 76 and 77 are then shorted and the dynamo functions as a shunt wound generator; the ignition switch rotor 85 is then engaged by the flexible arm 87 and the ignition circuit is completed through fuse 91, ignition coil 88, timer 89, and spark plug 90. The current generated may be used for ignition or line.

In the "low" position of the switch, the contacting segment engages terminals 82, 83 and 84. The ignition circuit remains closed, and the dynamo still functions as a generator. Shunt field resistances 76 and 77 are now in series with the shunt field 74 of the dynamo, thus greatly reducing the terminal voltage and providing a moderate rate of charging.

In the "stop" position of the switch pointer, the contacting segment engages only the terminals 83 and 84. The engine is inoperative because the ignition switch rotor has opened the ignition circuit. Current is available through battery and line circuits.

In the "belt" position of the switch, as will be indicated by pointer 93, the contacting segment engages only the terminals 83 and 84. The ignition circuit is closed and the engine is in operation, but the generator is dead. The battery supplies the ignition and line current, and the engine, thus relieved of supplying power for charging, has its full power available for delivery at the pulley. Terminal 80, not being engaged by the contacting segment, the series field is of course open, when the switch is in belt position. The shunt field, in circuit with resistance 76, is connected across the brushes, but the shunt field being of relatively high resistance, and in series with resistance 76, the arrangement is that of an unloaded shunt generator, the speed of which is of course regulated in the present instance by the engine governor.

In the "line" position of the switch, the contacting segment engages terminals 80 and 84. The ignition circuit is closed and the dynamo functions as a compound generator to maintain a constant line voltage. This current is used directly for ignition and line load, as the battery circuit is open.

In the "dead" position of the switch, all circuits are open, including ignition.

The particular construction of the switch, the arrangement of the switch terminals, etc., in the described example, provide for extreme simplification of the various circuits, and provide a simple switching mechanism which is especially adapted for use together with the mechanical reverse-current cut-out shown in Figs. 3 and 4.

Obviously, many features of the switch mechanism, terminals, connections, circuits, and the cut-out, as well as the means interconnecting these parts and the governor actuated mechanism, may be varied substantially without departure from the scope and full intendment of this invention.

I claim as my invention:

1. In an electric generating plant including an internal combustion engine, a dynamo, a storage battery, a carburetor, a throttle, a starting-choke, a switch, arranged for selectively establishing circuits between the dynamo and battery, a speed-responsive member adapted normally to position the throttle, choke and switch.

2. In an electric generating plant including an internal combustion engine, a dynamo, a storage battery, a throttle, a starting choke, a control switch, arranged for making and breaking circuit between the dynamo and battery, and a starting lever in operative relation to the throttle, choke and switch, and a governor-actuated member adapted normally to position the throttle, choke and switch.

3. In an electric generating plant including an internal combustion engine, a generator, a battery, a throttle, a starting choke, a control switch, for selectively connecting the generator and battery, a control shaft for said throttle, choke, and switch, said shaft being movable responsive to engine speed, and a manual starting control, associated with the shaft.

4. In a power plant comprising an internal combustion engine, a governor therefor, a dynamo and battery, a priming device for the engine and a governor-controlled cut-out, switch in circuit between the dynamo and battery, said priming device and cut-out being associated with a common control means.

5. In a power plant comprising an internal combustion engine, a governor, a dynamo and a battery, a throttle, a starting-choke, a priming device, and a cut-out switch in circuit between the dynamo and battery, adapted to be opened by the governor, and a controlling means common to said throttle, choke, and priming device, and arranged for closing the cut-out switch, for starting the engine.

6. In a power plant comprising an internal combustion engine, a governor therefor, a dynamo, a battery, a throttle, a starting-choke, a priming device, and a cut-out switch in circuit between the battery and dynamo, said throttle, choke and primer being operatively associated with a common rotatable control shaft, and means including said shaft, for operatively associating the governor and cut-out switch.

7. In a power plant comprising an internal combustion engine, a dynamo connected thereto, a battery, a throttle, a starting choke, a priming device, and a cut-out switch, between the dynamo and battery, said throttle, choke, primer and switch being operatively associated with a common control shaft, a lever associated with the shaft adapted to position said throttle, choke, priming device, and cut-out switch during the starting period of said engine, and speed responsive means adapted to position the shaft for control of said elements during normal operation of the engine, and arranged, through said shaft, to open the cut-out switch upon a predetermined reduction in engine speed.

8. In a power plant, an engine, an electric-machine connected thereto, a battery, means for establishing and selectively controlling electrical circuits between the battery and machine, said means comprising a circuit selector, a protective switch, a manually operated element for completing a circuit through said selector and through said switch, and means operatively associated with the engine, and adapted for control movement responsively to changes in engine speed, to maintain said switch in closed position during normal operation of the engine.

9. In a system for generating electricity, comprising an engine, an electric-machine connected thereto, a storage battery, means for selectively connecting the machine and battery in circuit relation, said means including a multi-pole switch and a protective switch, each adapted to effect predetermined circuit relations between said machine and battery; an operating member adapted to make a connection through both of said switches, and mechanical means including a governor, responsive to engine speed, adapted normally to maintain a connection through one of said switches, and adapted to open said switch responsively to a determined, reduced engine speed.

10. A power plant comprising an engine, an electric machine, a battery; conductors disposed for effecting selective connections between the battery and machine, a circuit selector and a protective switch, an element operable to close a circuit between the battery and machine, through said selector and said switch, and a device mechanically controlled by the engine, adapted normally to maintain a connection between the battery and machine.

11. In a power plant comprising an engine, generator and a battery, conductors connecting the battery and engine for ignition purposes, conductors arranged for selectively connecting the generator and battery in different circuit relations, a multi-pole selector switch, a protective switch, an ignition switch and an actuating element common to, and adapted to position each of said switches to attain a predetermined operating condition of the plant.

12. In a power plant, an engine, an electric machine connected thereto, a battery, a plurality of conductors, a regulating and controlling device, adapted with the conductors for establishing selective circuit relations between the machine and battery, a protective switch, a manual operating element common to said device and said switch, and adapted to be actuated to effect full manipulative control of said device and the machine and battery circuits, independently of the position of said protective switch.

13. In a power plant, an engine, an electric machine connected thereto, an electric ignition circuit for the engine, a battery, a plurality of conductors, a regulating and controlling device adapted with the conductors for selectively establishing a plurality of circuit relations between the machine and battery, said device comprising an ignition switch; a battery protective switch, a manual operating element common to said device and said switch, and adapted to be movable to place said device in any predetermined position for regulating and controlling the ignition and machine circuits, independently of the position of said protective switch.

14. In a power plant, an engine, an electric-machine connected thereto, a storage battery in circuit with the electric-machine, a plurality of conductors and switches therebetween, the switches having a common operating element; one of the switches having a plurality of closed positions, and being freely movable between such positions, to effect regulation and control of the circuit relation between the machine and battery, another switch arranged for movement by said element to one position, and engine operated means to move said second switch to another position.

15. In a power plant, an engine, an electric-machine, a battery, a plurality of conductors and switches between the machine and battery, a manual operating element common to said switches, one of said switches being capable of movement by said element, to any switch position, independently of the position of another of said switches.

16. In a power plant comprising an engine, an electric machine, a battery, a plurality of conductors and switches for selectively establishing circuits between the machine and battery, a manual operating element adapted to permit closing said switches by a single manual movement, and mechanical means adapted responsively to a predetermined operating speed of the engine, to retain one of said switches in closed position.

17. In a power plant comprising an engine having a governor, an electric machine, a battery, a plurality of conductors and switches between the machine and battery, a common manual operating element for closing said switches, one of said switches having a plurality of poles arranged to be energized in selective group, and adapted selectively to establish various circuit relations between the machine and battery, said switch being capable of movement by said element to any switch position, independently of the position of another of said switches, said last named switch being adapted normally to be retained in closed position responsively to a predetermined speed, by the governor.

ADOLPH ROSNER.